US008205005B2

(12) United States Patent  
Leseberg et al.

(10) Patent No.: US 8,205,005 B2
(45) Date of Patent: Jun. 19, 2012

(54) PROGRAMMABLE LOGIC CONTROL DEVICE WITH INTEGRATED DATABASE DRIVER

(75) Inventors: Gerd Leseberg, Bad Pyrmont (DE); Werner Pollmann, Hoexter (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 216 days.

(21) Appl. No.: 11/861,642

(22) Filed: Sep. 26, 2007

(65) Prior Publication Data

US 2008/0082681 A1 Apr. 3, 2008

(30) Foreign Application Priority Data

Sep. 29, 2006 (DE) .......................... 10 2006 046 643

(51) Int. Cl.
*G06F 15/167* (2006.01)
*G06F 15/16* (2006.01)
*G06F 17/30* (2006.01)

(52) U.S. Cl. ........ 709/232; 709/212; 709/213; 709/229; 709/230; 709/250; 707/781

(58) Field of Classification Search .................. 709/212, 709/213, 232, 250
See application file for complete search history.

(56) References Cited

U.S. PATENT DOCUMENTS

| | | | | |
|---|---|---|---|---|
| 7,117,043 B1 * | 10/2006 | Frederick et al. | | 700/21 |
| 7,233,830 B1 * | 6/2007 | Callaghan et al. | | 700/9 |
| 2003/0154214 A1 * | 8/2003 | Tu et al. | | 707/104.1 |
| 2003/0200209 A1 * | 10/2003 | Smith et al. | | 707/3 |
| 2007/0073419 A1 * | 3/2007 | Sesay | | 700/18 |

FOREIGN PATENT DOCUMENTS

| | | |
|---|---|---|
| DE | 42 22 043 C1 | 7/1993 |
| DE | 100 04 861 A1 | 10/2001 |
| DE | 100 21 838 A1 | 11/2001 |
| DE | 102 10 280 A1 | 10/2002 |
| DE | 102 23 158 A1 | 12/2002 |
| DE | 100 65 401 A1 | 3/2003 |
| EP | 1 420 315 A1 | 5/2004 |
| JP | 11120245 A | 4/1999 |
| JP | 200175615 A | 3/2001 |
| JP | 2001-282316 A | 10/2001 |

(Continued)

OTHER PUBLICATIONS

Sato Takash, et al. "Application of IEC61131-3 for Semiconductor Processing Equipment"; Publication: Emerging Technologies and Factory Automation; Publication Date: 2001; vol. 2; ISBN: 0-7809-7241-7; Japan.

(Continued)

*Primary Examiner* — Mohamed Ibrahim
*Assistant Examiner* — Farrukh Hussain
(74) *Attorney, Agent, or Firm* — DeMont & Breyer, LLC

(57) ABSTRACT

The invention relates, in particular, to an automation system (10; 110), in which a programmable logic control device (20; 120) can be connected via a network (100; 200) to a database system (60; 160). So that the programmable logic control device (20; 120) can exchange data directly with the database system (60; 160), the programmable logic control device (20; 120) has a first driver module (42; 132) associated with a physical interface (50; 150) for controlling data transmission via the network (10; 110) and also a second driver module (41; 132) for controlling the data exchange with the database device (60; 160).

3 Claims, 2 Drawing Sheets

FOREIGN PATENT DOCUMENTS

WO    01/69335 A2    9/2001

OTHER PUBLICATIONS

Figure 1:
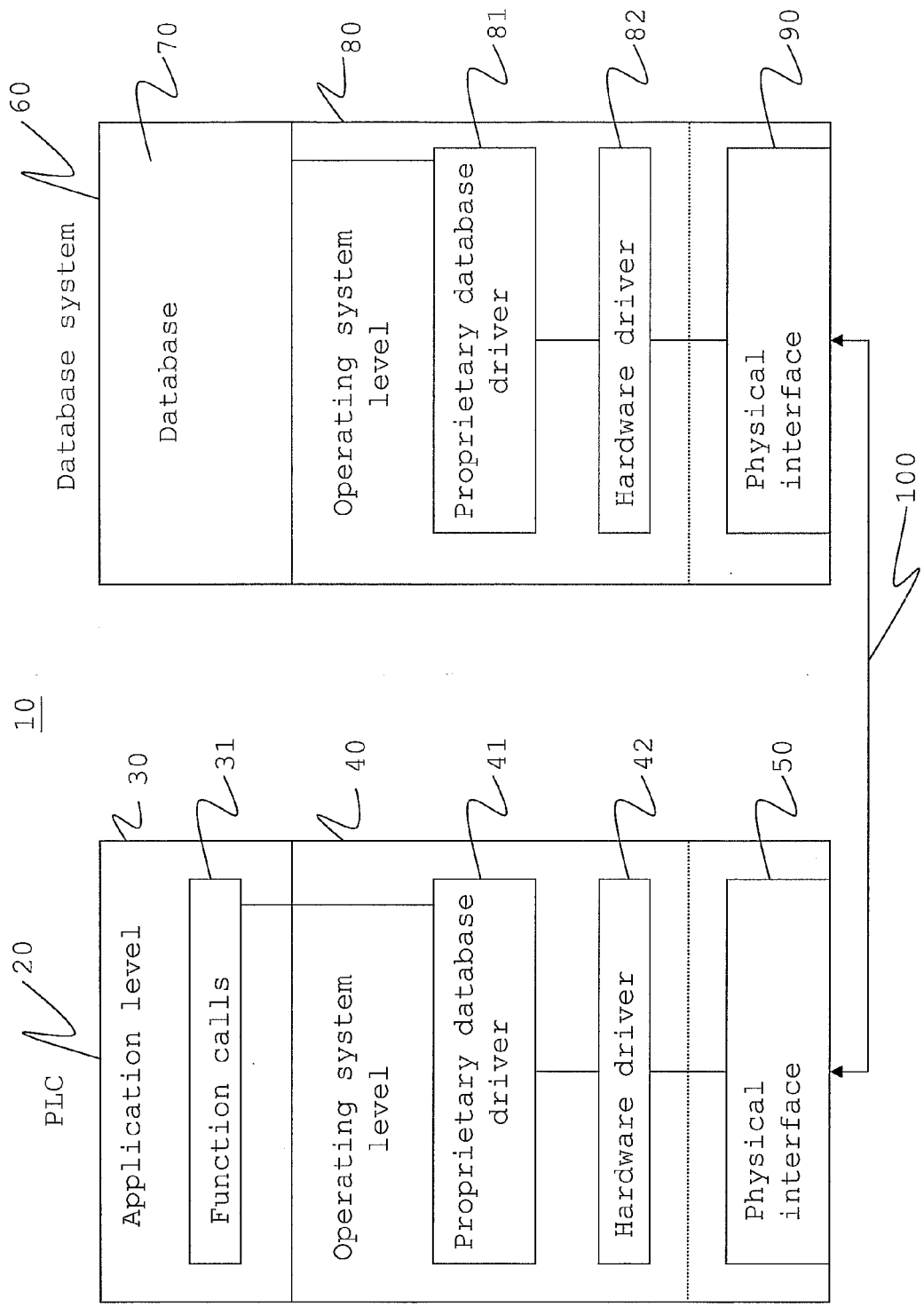

T. Kakisaki, "Office Action for Patent Application No. 2007-254153", Jan. 20, 2010, Publisher: Japanese Patent Office, Published in: JP.

"Japanese Office Action for Japanese International Application No. 207-254153 dated Sep. 22, 2010", Publisher: Japanese Patent Office, Published in: Japan.

Aoyama, J., "JP Application No. 2007-254153 Office Action Jul. 7, 2011", , Publisher: JPO, Published in: JP.

* cited by examiner

PROGRAMMABLE LOGIC CONTROL DEVICE WITH INTEGRATED DATABASE DRIVER

The invention relates to a data transmission system with at least one programmable logic control device and at least one database device, which are connected to a network, for example, Ethernet. The invention further relates to a programmable logic control device, which is constructed preferably for use in such a data transmission system.

In general, it is known to store large amounts of data, which occur, for example, in businesses, in database systems. In this way, the data generated, for example, by a personal computer, can be written into the database and also read out again by the personal computer. The data in the database is managed by data management software, which can include, among other things, a database language, for example, SQL (Structured Query Language). The data management software and thus also the database language are implemented in a database driver and allow, among other things, personal computers to store data in the database and to request data from the database.

Large amounts of data also occur in the control, monitoring, and configuration of automation systems. The control and monitoring tasks are here performed, for example, by programmable logic controller (PLC), which provide corresponding input and output interfaces to which sensors or actuators can be connected. A disadvantage of the programmable logic controller that are used is to be seen in that the data to be managed must be stored in an internal data memory.

Consequently, the invention is based on the task of making available a data transmission system, especially an automation system, in which all of the accumulating data, and also the data delivered by a programmable logic controller, can be stored in a separate database.

A core idea of the invention is to be seen in that a programmable logic controller is equipped with an additional driver module that allows direct communications with a database device, so that the PLC can transfer data to the database device and can read it out again from the database device.

The technical problem named above is solved, for one, by the features of claim 1.

Accordingly, a data transmission system is provided that has at least one programmable logic control device and at least one database device, which are connected to each other via a network. The programmable logic control device has a first driver module associated with a physical interface for controlling data transmission via the network and also a second driver module for controlling the data exchange with the database device.

Consequently, the programmable logic control device advantageously no longer requires an internal data memory of a large capacity in order to store all of the essential data, for example, control parameters, sensor data, and the like.

Advantageous improvements are the subject matter of the subordinate claims.

Advantageously, the second driver module, also called database driver below, is implemented in the application level of the programmable logic control device. To be able to keep the programming expense low and to be able to keep programmable logic control devices open for a plurality of database systems, the second driver module includes a database communications protocol which is written in a language according to the IEC 61131 standard typical for programmable logic control devices. Advantageously, all of the necessary functions and protocols for exchanging data with the database device are written in one of the IEC 61131 languages.

If the second driver module is created in the application level, advantageously there is the possibility that the first driver module, also called hardware driver for short below, can be created in the application level, advantageously in a language of the IEC 611131 standard. In this case, the programmable logic control device can access the database device independent of its firmware or operating system. Alternatively, the hardware driver could also be created in the operating system of the programmable logic control device in a high-level language.

As a rule, the database devices connected to the network use a standardized database driver as part of the operating system.

To allow an open data exchange between the programmable logic control device and the database device, the second driver module of the programmable logic control device is constructed such that it can execute commands and functions of a conventional communications protocol for database systems.

Alternatively, the second driver module of the programmable logic control device can be part of the operating system or the firmware of the programmable logic control device. In this case, the second driver module involves a manufacturer-dependent, that is, a proprietary, database driver. In this case, data exchange with the database device is only possible when the corresponding proprietary database driver is also implemented in the database device.

Thanks to the measure of implementing an IEC 61131-based database driver in a programmable logic control device, it is possible to integrate essentially each programmable logic control device based on the IEC 61131 standard into a network in order to exchange data with a database device. The operating system or the firmware of the programmable logic control device must then still contain only a rudimentary hardware driver, which is necessary for setting up a physical connection between the programmable logic control device and the database device via the network. If, for example, Ethernet is used as the network, the hardware driver must support only an Ethernet connection between the programmable logic control device and the database server. In this way, it is sufficient for the first driver module of the programmable logic control device to contain only one Ethernet chipset. The necessary TCP/IP protocol driver can then be realized in the IEC 61131 application level or in the operating system/firmware environment of the programmable logic control device.

The technical problem named above is also solved by the features of claim 10. Accordingly, a programmable logic control device is provided that has a first driver module associated with a physical interface for controlling data transmission via a network and also a second driver module for controlling the data exchange with an external database device.

Advantageous refinements are described in the subordinate claims.

Figure 2:
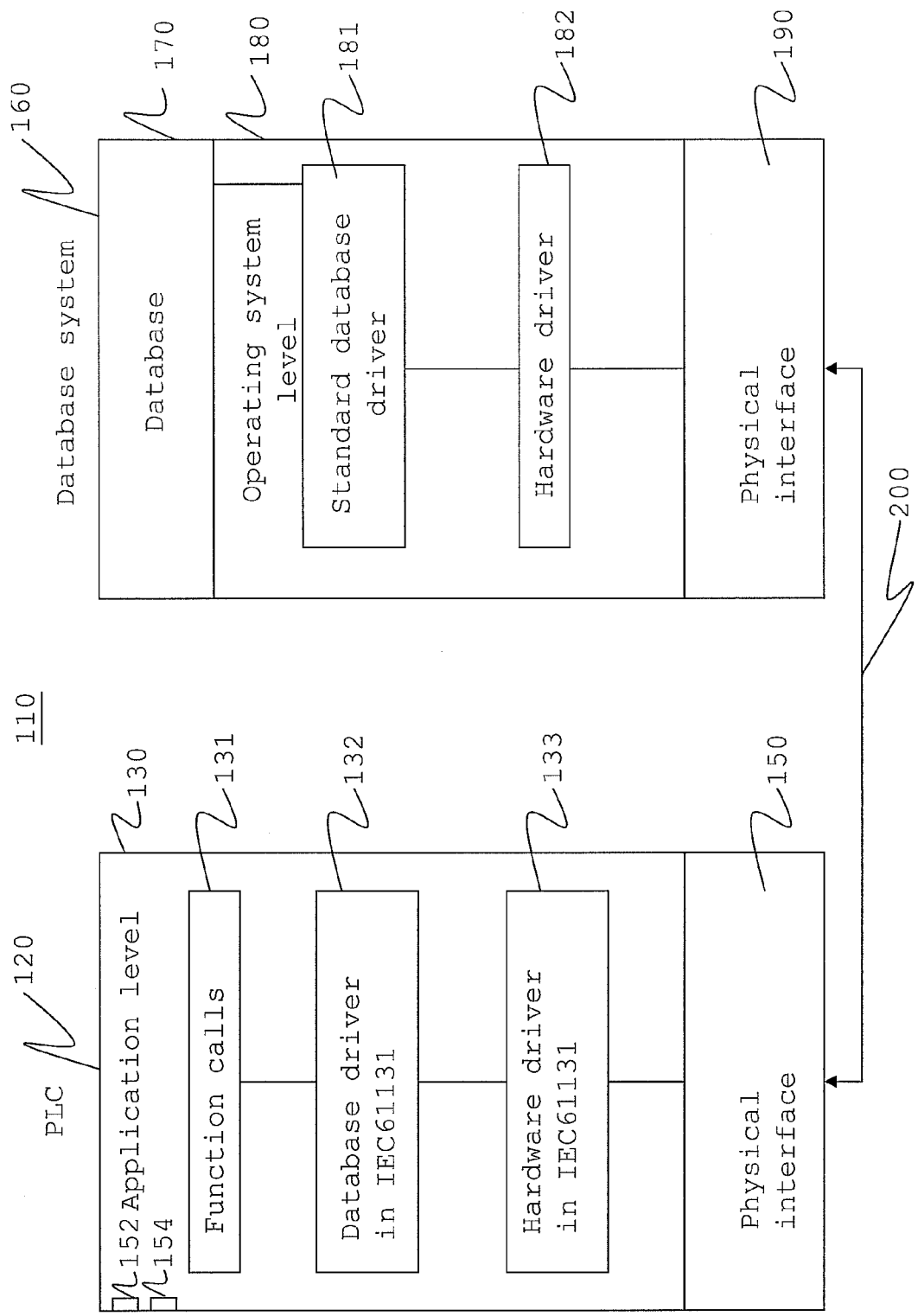

The invention is described in more detail below with reference to two embodiments in connection with the enclosed drawings. Shown are:

FIG. 1, an example data transmission system with a PLC and a database system, which can exchange data via a corresponding database driver, and FIG. 2, an alternative embodiment of a data transmission system, in which a PLC can exchange data with a database device.

FIG. 1 shows schematically a section from an example automation system 10, in which a programmable logic control device 20, called PLC for short below, can exchange data directly with a database system 60 via a network. The network is shown schematically in the present example by a connection line 100, which can be, for example, an Ethernet connection. Conventionally, the programmable logic control device 20 has an application level 30, in which application software, for example for controlling, monitoring, and configuring the automation system 10, is stored. In the application level 30, a function block 31 is additionally shown which can start and terminate function calls for reading data from a database and/or for writing data into a database. It should be noted that the software in the application level 30 is preferably written in a language of the IEC 61131 standard. Furthermore, in a known way the PLC 20 contains an operating system and/or firmware level 40. So that the PLC 20 can transmit data to the database system 60 and can request data from this system, a proprietary database driver 41, which converts the function calls from the function block 31 into corresponding database control commands, is implemented in the operating system or the firmware level 40 of the PLC 20. With the help of the proprietary database driver 41, the PLC 20 is in the position to exchange data with the database system 60 via the network 100. In particular, the PLC 20 can request data from the database system 60 by means of the proprietary database driver 41. Furthermore, implemented in the operating system or firmware level 40 is a hardware driver that feeds the commands coming from the proprietary database driver 41 to a physical interface 50. The database control commands are then transmitted from the physical connection 100 via the network 100 to a corresponding physical interface 90 of the database system 60.

In a known way, the database system 60 contains an operating system that has a hardware driver 82 and a proprietary database driver 81, which can exchange data with the proprietary database driver 41 of the PLC 20. In addition, the database system 60 contains a data memory, that is, the actual database 70.

An alternative embodiment of a data transmission system 110 is shown in FIG. 2.

A network is shown schematically, in turn, by a connection 200, which connects a programmable logic control device 120, called PLC for short, and a database system 160 to each other.

An essential difference from the programmable logic control device 20 shown in FIG. 1 consists in that the PLC 120 contains a database driver 132 in the application level 130 of the PLC 120 instead of a proprietary database driver arranged in the firmware or in the operating system of PLC 20. Implemented in the database driver 132 is a communications protocol, for communications with the database system 160, that is written in a language of the IEC 61131 standard. Both the application software of the PLC 120 and also the function call module 131 are written in a language of the IEC 61131 standard. The function call module 131 comprises control software, with whose help application programs of the PLC 120 can be transmitted to the database system 160 and can be read from the database system 160 or a database 170 implemented in the database system. Because the database driver 132 has been written independent of the firmware or the operating system of the PLC 120, the PLC 120 can communicate with usual standard database drivers. Consequently, such a standard database driver 181 is implemented in the database system 160 in the operating system level 180.

If the database driver 132 is written in an IEC 61131 language, it is also possible to write a hardware driver 133 in an IEC 61131 language and to implement it in the application level 130 of the PLC 120. Alternatively, the hardware driver 133 can also be a component of the firmware or the operating system of the PLC 120. This variant is not shown.

Similarly to the system 10 shown in FIG. 1, both the PLC 120 and also the database system 160 have a physical interface 150 or 190, by means of which the data can be transmitted via the network 200. Similarly to the database system 60, the database system 160 also has a hardware driver 182 in the operating system level in addition to the standard database driver 181.

Furthermore, the PLC 120 has at least one input interface 152, to which a sensor (not shown) can be connected. Furthermore, at least one output interface 154 is provided, to which an actuator (also not shown) can be connected.

If the network is Ethernet, the hardware driver of the PLC and the database system contain the required TCP-IP protocol driver, which converts the data to be transmitted to the Ethernet format in a known way.

As an example, the function of the database transmission system 110 is explained below in connection with FIG. 2.

First, it shall be assumed that a temperature sensor, which regularly transmits temperature data to the PLC 120, is connected to the input interface 152 of the PLC 120. To be able to store the temperature data received at the PLC 120 in the database 170, a control program running in the PLC 120 accesses the function call module 131 in order to signal to the database driver 132 that data is now to be transmitted to the database system 160. The corresponding database write instruction is transmitted from the database driver 132 to the hardware driver 133, which converts the database write instruction into a data format that can be transmitted via the physical interface 150 and the Ethernet 200 to the physical interface 190 of the database system 160. From there, the database write instruction is forwarded via the hardware driver 182 to the standard database driver 181. Now it is signaled to the database system 160 that temperature data, which is to be stored in the database 170, is arriving from the PLC 120. The temperature data is transmitted from the PLC 120 either together with the database write instruction or writing at a later time to the database system 160 and written into the database 170. Under the control of a data management program, which is implemented in the standard database driver 181, the received temperature data is stored at corresponding locations in the database 170.

Thanks to the database driver 132, an application program running in the PLC 120 can also read data from the database 170. For this purpose, the application program accesses the function call module 131 in order to prompt the PLC 120 to transmit a database read instruction via the database driver 132, the hardware driver 133, and the physical interface 150 to the physical interface 190 of the database system 160, and from there via the hardware driver 182 to the standard database driver 181 of the database system 160. The database read instruction contains information on the data that the application software of the PLC 120 would like to request. Then the corresponding data is read out from the database 170 under the control of the standard database driver 181 and transmitted to the PLC 120.

The invention claimed is:
1. A data transmission system with at least one programmable logic control device and at least one database device that are connected to each other via a Transmission Control Protocol/Internet Protocol (TCP/IP)-based network;

wherein the database device has a standard database driver and a hardware driver for converting the data to be transmitted to a data format that can be transmitted via the TCP/IP-based network;

wherein the programmable logic control device has the following features:

a first driver module associated with a physical interface for controlling data transmission via the TCP/IP-based network, wherein the first driver module of the programmable logic control device and the hardware driver of the database device contain a TCP/IP protocol driver that is written in a language of the IEC 61131 standard; and a second driver module for controlling the data exchange with the database device;

wherein the second driver module is written in a programming language that is open for a plurality of different database systems, including the database device that comprises the standard database driver;

wherein the second driver module is implemented in the application level of the programmable logic control device and can execute commands and functions of a conventional communications protocol for database systems; and wherein the second driver module transmits an instruction of a conventional communications protocol for database systems to the first driver module which is implemented in the application level of the programmable logic control device and which for the transmission to the database device converts the instruction to a data format that can be transmitted via the TCP/IP-based network.

2. The data transmission system according to claim 1, characterized in that the database device contains a standard database driver adapted for communications with the second driver module of the programmable logic control device.

3. A programmable logic control device comprising:

a first driver module associated with a physical interface for controlling data transmission via a Transmission Control Protocol/Internet Protocol (TCP/IP)-based network; and a second driver module for controlling the data exchange with an external database device that has a standard database driver and a hardware driver;

wherein the second driver module is written in a programming language that is open for a plurality of different database systems, including the database device that comprises the standard database driver;

wherein the second driver module is implemented in the application level of the programmable logic control device and can execute commands and functions of a conventional communications protocol for database systems;

wherein the second driver module transmits an instruction of a conventional communications protocol for database systems to the first driver module which is implemented in the application level of the programmable logic control device and which for the transmission to the external database device converts the instruction to a data format that can be transmitted via the TCP/IP-based network; and wherein the first driver module of the programmable logic control device and the hardware driver of the database device contain a TCP/IP protocol driver that is written in a language of the IEC 61131 standard.

\* \* \* \* \*